(12) United States Patent
Kanno et al.

(10) Patent No.: US 9,991,599 B2
(45) Date of Patent: Jun. 5, 2018

(54) ANTENNA DEVICE, ELECTRONIC APPARATUS, AND METHOD OF MOUNTING ANTENNA DEVICE

(71) Applicant: Dexerials Corporation, Shinagawa-ku, Tokyo (JP)

(72) Inventors: Masayoshi Kanno, Tokyo (JP); Norio Saito, Tochigi (JP); Manabu Suzuki, Nogi-machi (JP); Katsuhisa Orihara, Utsunomiya (JP)

(73) Assignee: Dexerials Corporation, Shinagawa-ku, Tokyo (JP)

( * ) Notice: Subject to any disclaimer, the term of this patent is extended or adjusted under 35 U.S.C. 154(b) by 15 days.

(21) Appl. No.: 15/227,150

(22) Filed: Aug. 3, 2016

(65) Prior Publication Data
US 2017/0040673 A1 Feb. 9, 2017

(30) Foreign Application Priority Data

Aug. 7, 2015 (JP) .................. 2015-157551
Mar. 24, 2016 (JP) .................. 2016-060625

(51) Int. Cl.
| | |
|---|---|
| H01Q 7/06 | (2006.01) |
| H01Q 1/22 | (2006.01) |
| H01Q 1/24 | (2006.01) |
| H04B 5/00 | (2006.01) |
| H01Q 1/38 | (2006.01) |
| H01Q 1/52 | (2006.01) |

(52) U.S. Cl.
CPC .............. H01Q 7/06 (2013.01); H01Q 1/2225 (2013.01); H01Q 1/243 (2013.01); H01Q 1/38 (2013.01); H04B 5/0031 (2013.01); *H01Q 1/526* (2013.01)

(58) Field of Classification Search
CPC .......... H01Q 7/00; H01Q 7/06; H01Q 1/2225; H01Q 1/2208; H01F 5/04; H01F 2005/043; H01F 2005/046
See application file for complete search history.

(56) References Cited

U.S. PATENT DOCUMENTS

| | | | |
|---|---|---|---|
| 9,633,305 B2 * | 4/2017 | Ito ..................... | G06K 19/07783 |
| 2010/0230498 A1 * | 9/2010 | Atherton ............ | G06K 7/10178 235/492 |
| 2012/0138678 A1 * | 6/2012 | Bashan ................. | H04M 1/026 235/380 |
| 2013/0112754 A1 * | 5/2013 | Ikemoto ............. | G06K 7/10336 235/488 |

FOREIGN PATENT DOCUMENTS

JP 5545371 B2 7/2014

* cited by examiner

*Primary Examiner* — Robert Karacsony
(74) *Attorney, Agent, or Firm* — Kenja IP Law PC (57) ABSTRACT

In order to reduce device size and costs, an antenna device incorporated into an electronic apparatus is provided with an antenna substrate including an antenna coil portion having an antenna coil formed therein, a component portion, and a bending portion arranged along the X-direction, the bending portion being sandwiched between the antenna coil portion and the component portion, wherein on each of the front surface and the back surface of the component portion, an I/O interface for connecting electrically to the body of the electronic apparatus is provided. The antenna substrate is bendable at the bending portion.

14 Claims, 9 Drawing Sheets

Prior Art

FIG. 13B

Prior Art

FIG. 13C

Prior Art

ANTENNA DEVICE, ELECTRONIC APPARATUS, AND METHOD OF MOUNTING ANTENNA DEVICE

CROSS-REFERENCE TO RELATED APPLICATION

This application claims priority to and the benefit of Japanese Patent Application No. 2015-157551 filed Aug. 7, 2015, and Japanese Patent Application No. 2016-060625 filed Mar. 24, 2016, the entire disclosure of these earlier applications being incorporated herein by reference.

TECHNICAL FIELD

This disclosure relates to an antenna device, an electronic apparatus, and a method of mounting an antenna device.

BACKGROUND

An antenna device is sometimes mounted in an electronic apparatus, such as a smartphone or tablet terminal, in order to perform contiguous communication such as Near Field Communication (NFC). In the case of mounting an antenna device in an electronic apparatus, the antenna device is required to be compact, to be able to connect reliably to the mainboard of an electronic apparatus, and to be easy to mount in the electronic apparatus.

In general, an antenna device includes an antenna substrate onto which are mounted an antenna coil for transmitting and receiving signals, a connection terminal for connecting electrically to the mainboard of the electronic apparatus in which the antenna device is mounted, and an electronic component such as a resonant circuit, a matching circuit, a filter, and a Radio Frequency Integrated Circuit (RFIC). The size of the antenna coil is determined by the communication characteristics that are required. On the other hand, the connection terminal and the electronic component do not relate directly to the transmission and reception of signals and are thus a factor inhibiting a reduction in size of the antenna device.

Therefore, JP 5545371 B2 (PTL 1) discloses an antenna device including a first base member on which an antenna conductor is disposed, a second base member on which an electronic component is disposed, and a flexible substrate (antenna substrate) including a bent portion that connects the first base member and the second base member, wherein the flexible substrate is bent at the bent portion so that the main surface of the first base member and the main surface of the second base member face each other. According to this antenna device, the antenna substrate is bent at the bent portion. Therefore, in plan view, the area when mounting the antenna device can be reduced.

CITATION LIST

Patent Literature

PTL 1: JP 5545371 B2

SUMMARY

Figure 13A:
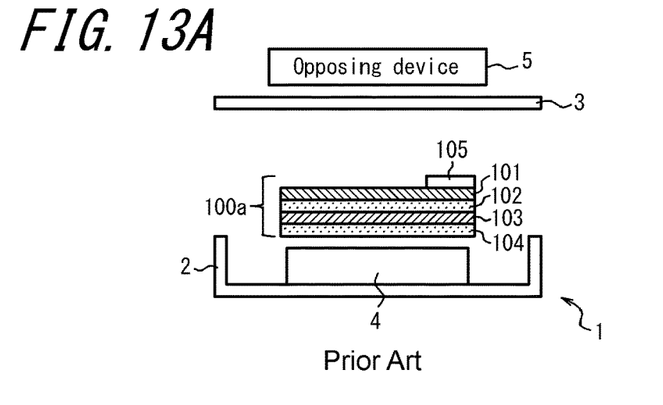
FIGS. 13A, 13B, and 13C illustrate examples of mounting a related antenna device in an electronic apparatus.
Figure 13B:
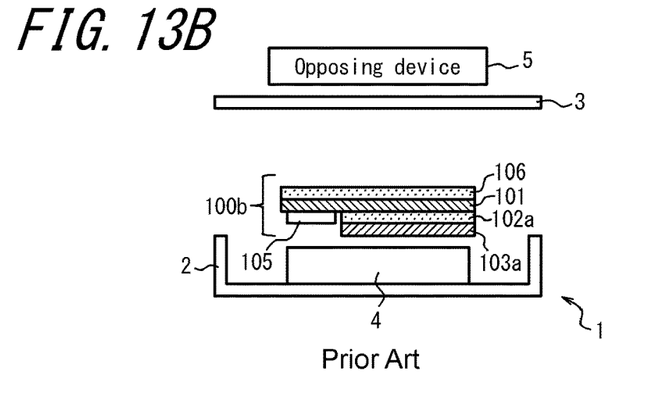
Figure 13C:
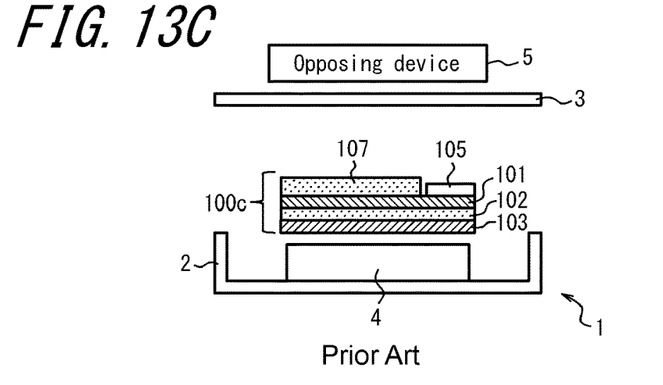

FIGS. 13A to 13C illustrate examples of mounting an antenna device on an electronic apparatus. As illustrated in FIGS. 13A to 13C, an electronic apparatus 1 typically includes a front surface side body 2 and a back surface side body 3 attached to the body 2 from the back to act as a cover. A battery 4 is provided in the body 2. Normally, the antenna device is fixed to the battery 4 or the body 3 with adhesive or screws. In recent years, along with the decreased thickness of electronic apparatuses, the antenna device has mainly been attached with adhesive.

FIG. 13A illustrates an example of mounting in which an antenna device 100a is adhered onto the battery 4. First, the structure of the antenna device 100a in this mounting example is described.

The antenna device 100a illustrated in FIG. 13A includes an antenna substrate 101, an adhesive layer 102 provided on the lower surface (on the front surface side of the electronic apparatus 1) of the antenna substrate 101, ferrite 103 provided on the lower surface of the adhesive layer 102, an adhesive layer 104 provided on the lower surface of the ferrite 103, and at least one electronic component 105 provided on a portion of the upper surface of the antenna substrate 101.

The antenna substrate 101 includes an antenna coil for contiguous communication with an opposing device 5 on the body 3 side. The adhesive layer 102 adheres the antenna substrate 101 to the ferrite 103. The ferrite 103 is a magnetic sheet provided for magnetic separation between the antenna of the antenna substrate 101 and the various components in the electronic apparatus 1, in order to prevent the communication range of the antenna device 100a from being shortened due to the effect of metal within the electronic apparatus 1, such as a battery case, copper foil in a printed circuit board, and the like. Accordingly, the ferrite 103 is provided on the side of the antenna substrate 101 farther from the opposing device 5 (on the battery 4 side). The electronic component 105 is an electronic component such as a resonant circuit, a matching circuit, a filter, an RFIC, or the like. The antenna device 100a is adhered to the battery 4 by the adhesive layer 104.

In the mounting example illustrated in FIG. 13A, the body 3 only functions as the back cover of the body 2. Accordingly, the antenna device 100a can be inspected with the body 3 removed and is easy to maintain. The position of attachment of the antenna device 100a, however, is affected by the size and position of the battery 4.

FIG. 13B illustrates an example of mounting in which an antenna device 100b is adhered onto the body 3. First, the structure of the antenna device 100b in this mounting example is described. In FIG. 13B, structural elements that are the same as in FIG. 13A are assigned the same labels, and a description thereof is omitted.

The antenna device 100b illustrated in FIG. 13B differs from the antenna device 100a illustrated in FIG. 13A in that the adhesive layer 104 is eliminated, an adhesive layer 106 is added, and the adhesive layer 102 and ferrite 103 are changed to an adhesive layer 102a and ferrite 103a.

The adhesive layer 102a is cut so as not to cover a portion of the lower surface of the antenna substrate 101 and adheres the antenna substrate 101 to the ferrite 103a. The ferrite 103a is cut to match the adhesive layer 102a. The electronic component 105 is disposed on the lower surface of the antenna substrate 101, in the cutout portion of the adhesive layer 102a and the ferrite 103a. The antenna device 100b is adhered to the body 3 by the adhesive layer 106.

In the mounting example illustrated in FIG. 13B, the antenna device 100b is adhered to the body 3. Therefore, the position of attachment and the size of the antenna device 100b is not affected by the size and position of the battery 4, and the distance from the opposing device 5 can be shortened. In the mounting example illustrated in FIG. 13B, however, inspection needs to be performed with the body 3 attached to the body 2, and maintenance is difficult. In recent years, the body 3 has been formed as a curved surface in some devices. In this case, it is difficult to use a thick magnetic sheet for the ferrite 103a, preventing sufficient magnetic separation between the antenna of the antenna substrate 101 and the various components in the electronic apparatus 1.

FIG. 13C illustrates an example of mounting in which an antenna device 100c is adhered onto the body 3. First, the structure of the antenna device 100c in this mounting example is described. In FIG. 13C, structural elements that are the same as in FIG. 13A are assigned the same labels, and a description thereof is omitted.

The antenna device 100c illustrated in FIG. 13C differs from the antenna device 100a illustrated in FIG. 13A in that the adhesive layer 104 is eliminated, and an adhesive layer 107 is added.

The adhesive layer 107 is provided on the upper surface of the antenna substrate 101, in a region other than the region where the electronic component 105 is disposed. The antenna device 100c is adhered to the body 3 by the adhesive layer 107.

In the mounting example illustrated in FIG. 13C, the antenna device 100c is adhered to the body 3 by the adhesive layer 107 that is provided on the upper surface of the antenna substrate 101 in a region other than the region where the electronic component 105 is disposed. Therefore, the position of attachment and the size of the antenna device 100c is not affected by the size and position of the battery 4, thus ensuring the antenna size. In the antenna device 100c, however, the adhesive layer 107 needs to be at least as thick as the height of the electronic component 105 and normally needs to be extremely thick, such as 0.5 mm to 1 mm. A problem with the mounting strength thus occurs. The distance between the opposing device 5 and the antenna of the antenna substrate 101 also increases, and the antenna device 100c is thicker overall than the antenna device 100a or the antenna device 100b.

As described with reference to FIGS. 13A to 13C, there are advantages and disadvantages to the various mounting methods. The mounting method and structure of the antenna device has therefore been designed individually in accordance with the electronic apparatus into which the antenna device is incorporated. In other words, it has been difficult to share antenna devices between a plurality of electronic apparatuses (i.e. to achieve a common antenna device). This leads to the problem of increased costs due to the need for individually designed antenna devices.

As described above, the antenna device disclosed in PTL 1 can be reduced in size at the time of mounting. In the antenna device disclosed in PTL 1, however, the antenna substrate is assumed to be bent in only one direction (a state in which the main surfaces of the first base and the second base face each other), and no consideration is made of achieving a common antenna device.

It would therefore be helpful to provide an antenna device, an electronic apparatus, and a method of mounting an antenna device that can reduce device size and cost.

An antenna device according to this disclosure is an antenna device to be incorporated in an electronic apparatus, the antenna device comprising: an antenna substrate including an antenna coil portion having an antenna coil formed therein, a component portion, and a bending portion arranged along a first direction, the bending portion being sandwiched between the antenna coil portion and the component portion, wherein on each of a front surface and a back surface of the component portion, an I/O interface for connecting electrically to a body of the electronic apparatus is located; and the antenna substrate is bendable at the bending portion.

The antenna device preferably further includes a magnetic sheet on at least one of a front surface and a back surface of the antenna coil portion.

In the antenna device, an electronic component is preferably mounted on one of the front surface and the back surface of the component portion.

In the antenna device, the bending portion preferably includes a slit extending in a second direction orthogonal to the first direction.

In the antenna device, a width of the component portion in a second direction orthogonal to the first direction is preferably less than a width of the antenna coil portion in the second direction.

In the antenna device, a center line of the antenna coil portion in a second direction orthogonal to the first direction is preferably shifted from a center line of the component portion in the second direction.

In the antenna device, with the bending portion in a bent state, a magnetic shield member that shields against magnetic fields is preferably provided on the front surface side or the back surface side of the component portion, whichever is opposite from a surface of the component portion on which the I/O interface that connects electrically to the body of the electronic apparatus is located.

In the antenna device, with the bending portion in a bent state, a beta ground pattern that shields against magnetic fields is preferably formed on the front surface or the back surface of the component portion, whichever is opposite from a surface of the component portion on which the I/O interface that connects electrically to the body of the electronic apparatus is located.

In the antenna device, with the bending portion in a bent state, a magnetic shield member that shields against magnetic fields is preferably provided on a front surface side or a back surface side of the antenna coil portion, whichever faces an opposite surface of the component portion from a surface of the component portion on which the I/O interface that connects electrically to the body of the electronic apparatus is located.

The antenna device preferably further includes a magnetic shield member that shields against magnetic fields on an inner layer of the component portion.

An electronic apparatus according to this disclosure is an electronic apparatus into which the antenna device is incorporated, wherein the electronic apparatus is adhered to one of a front surface and a back surface of the antenna coil portion by an adhesive member.

In the electronic apparatus, the bending portion is preferably bent.

A method, according to this disclosure, of mounting an antenna device in an electronic apparatus is a method of mounting an antenna device in an electronic apparatus into which one of the above-described antenna devices is incorporated, the method comprising: adhering the electronic apparatus to one of a front surface and a back surface of the antenna coil portion with an adhesive member.

In the method, the bending portion is preferably bent.

The antenna device, electronic apparatus, and method of mounting an antenna device according to this disclosure can reduce device size and cost.

DETAILED DESCRIPTION

The following describes embodiments with reference to the drawings. This disclosure is not limited to the following embodiments, and a variety of modifications may be made without departing from the scope of this disclosure.

Figure 1:
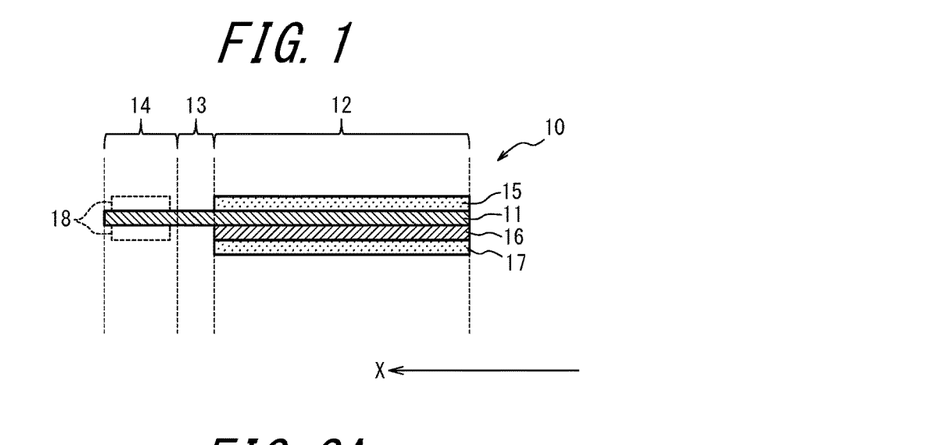
FIG. 1 is a cross-sectional diagram illustrating the structure of an antenna device according to one of the disclosed embodiments.

FIG. 1 is a cross-sectional diagram illustrating the structure of an antenna device 10 according to one of the disclosed embodiments. The antenna device 10 according to this embodiment is mounted in an electronic apparatus 1 (FIG. 10) such as a smartphone, a tablet terminal, or the like. The antenna device 10 according to this embodiment is for performing contiguous communication, such as NFC, and can be used in both a Read/Write (R/W) mode and a card mode. The electronic apparatus 1 in which the antenna device 10 is mounted is not limited to the aforementioned examples and may be any object in which an antenna for contiguous communication is mounted.

The antenna device 10 illustrated in FIG. 1 includes an antenna substrate 11, an adhesive layer 15, ferrite 16, an adhesive layer 17, and at least one electronic component 18.

Figure 2A:
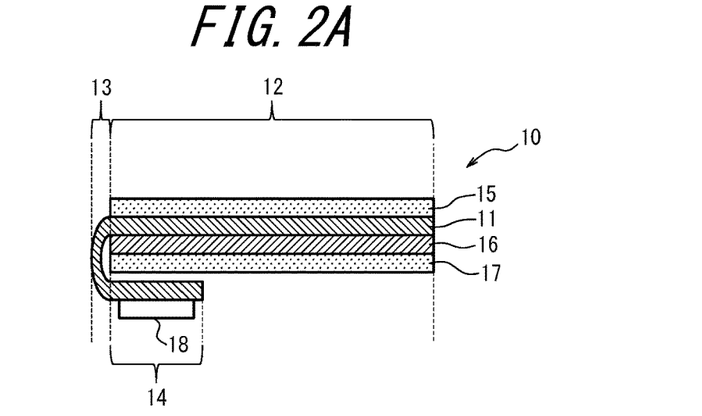
FIG. 2A illustrates the antenna device in FIG. 1 in a state of being bent downwards at the bending portion.
Figure 2B:
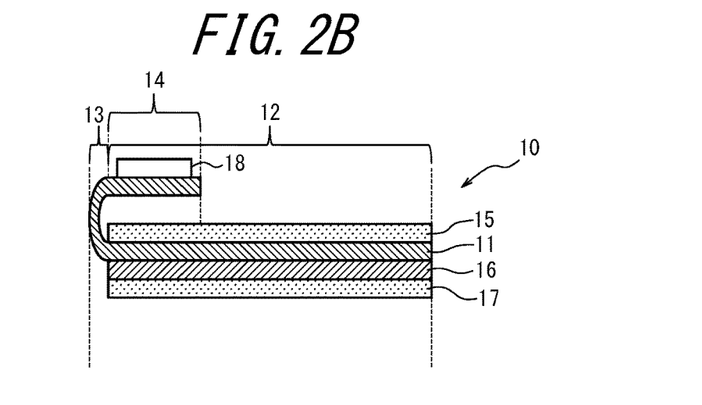
FIG. 2B illustrates the antenna device in FIG. 1 in a state of being bent upwards at the bending portion.

The antenna substrate 11 is, for example, formed by pattern printing, such as by etching a copper-clad laminated polyimide substrate. The antenna substrate 11 includes an antenna coil portion 12, a bending portion 13, and a component portion 14. The antenna coil portion 12, bending portion 13, and component portion 14 are arranged in this order along a predetermined direction (X-direction (first direction)). In other words, the bending portion 13 is sandwiched between the antenna coil portion 12 and the component portion 14, and the antenna coil portion 12 and the component portion 14 are connected by the bending portion 13. Within the antenna substrate 11, at least the bending portion 13 is flexible. Therefore, the antenna substrate 11 is bendable at the bending portion 13. The bending portion 13 can be bent downwards so that the component portion 14 faces the lower surface of the antenna substrate 11, as illustrated in FIG. 2A, and can be bent upwards so that the component portion 14 faces the upper surface of the antenna substrate 11, as illustrated in FIG. 2B.

Referring again to FIG. 1, the adhesive layer 15 is disposed on the upper surface of the antenna substrate 11 in a region corresponding to the antenna coil portion 12.

The ferrite 16 is disposed on the lower surface of the antenna substrate in a region corresponding to the antenna coil portion 12. The communication range of the antenna device 10 may be shortened due to the effect of metal within the electronic apparatus 1, such a battery case, copper foil in a printed circuit board, and the like inside the electronic apparatus 1 into which the antenna device 10 is incorporated. The ferrite 16 is a magnetic sheet provided for magnetic separation between the antenna of the antenna substrate 11 and the various components in the electronic apparatus 1, in order to prevent the communication range of the antenna device 10 from being shortened due to the effect of metal within the electronic apparatus 1, as described above.

The adhesive layer 17 is provided on the lower surface of the ferrite 16.

The electronic component 18 is an electronic component such as a resonant circuit, a matching circuit, a filter, an RFIC, or the like and may be provided on either the upper surface or the lower surface of the component portion 14. The electronic component 18 may be omitted.

Next, the structure of the antenna substrate 11 is described in further detail with reference to FIGS. 3A, 3B, and 4.

Figure 3A:
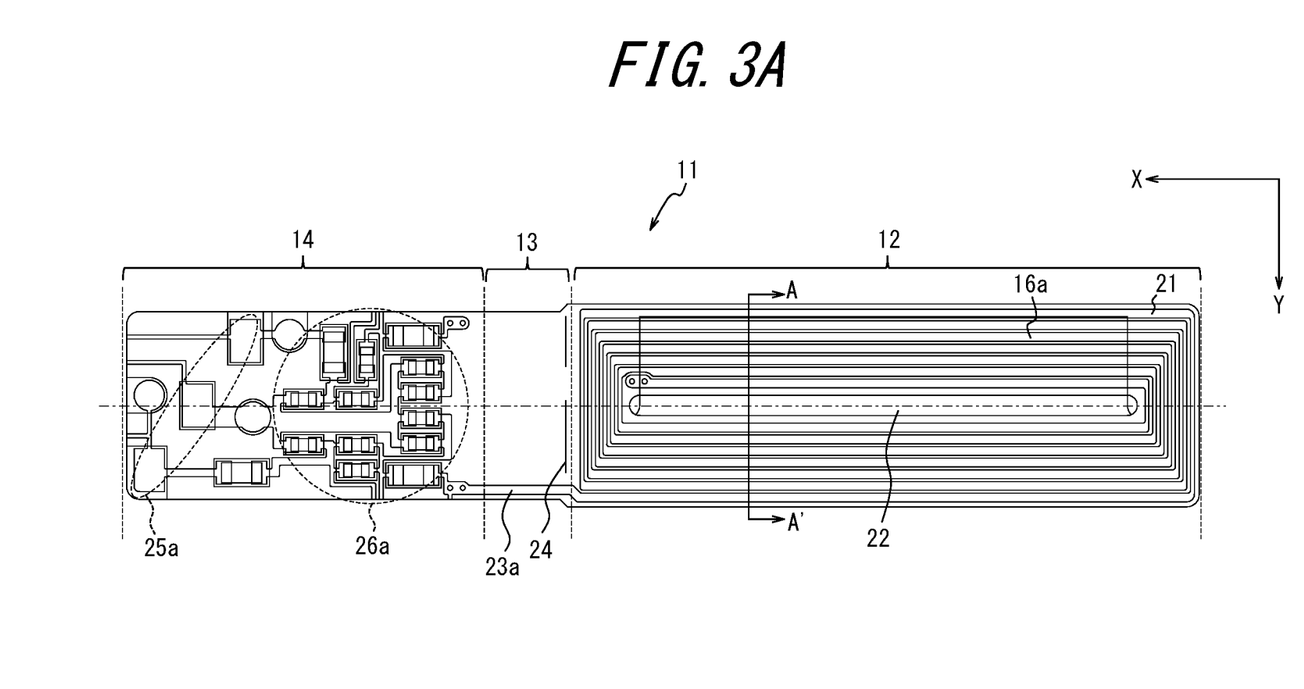
FIG. 3A is a top view of the antenna substrate in FIG. 1.

FIG. 3A illustrates the structure of the upper surface (front surface) of the antenna substrate 11. FIG. 3B illustrates the structure of the lower surface (back surface) of the antenna substrate 11. FIG. 4 is a cross-sectional diagram along the A-A' line in FIG. 3A when viewing in the direction of the arrows. In FIGS. 3A and 3B, structural elements that are the same as in FIG. 1 are assigned the same labels, and a description thereof is omitted. Hereinafter, the direction that lies along the surface of the antenna substrate 11 and is orthogonal to the X-direction is considered to be the Y-direction (second direction).

As described above, the antenna substrate 11 includes the antenna coil portion 12, the bending portion 13, and the component portion 14 arranged along the X-direction. The antenna coil portion 12 and the component portion 14 are connected by the bending portion 13. As illustrated in FIGS. 3A and 3B, the width of the bending portion 13 and the component portion 14 in the Y-direction is less than the width of the antenna coil portion 12 in the Y-direction. As a result, when the antenna substrate 11 is bent at the bending portion 13, the bending portion 13 and the component portion 14 do not protrude from the antenna coil portion 12 in the Y-direction in plan view.

An antenna coil 21 formed by an approximately spiral coil pattern is formed on the upper surface side of the antenna coil portion 12. The antenna coil 21 may have any of a variety of shapes, such as a rectangle, circle, ellipse, triangle, or the like. An opening 22 extending in the X-direction is provided in the center of the antenna coil portion 12. The opening 22 is provided so as not to cut off the coil pattern of the antenna coil 21.

Figure 3B:
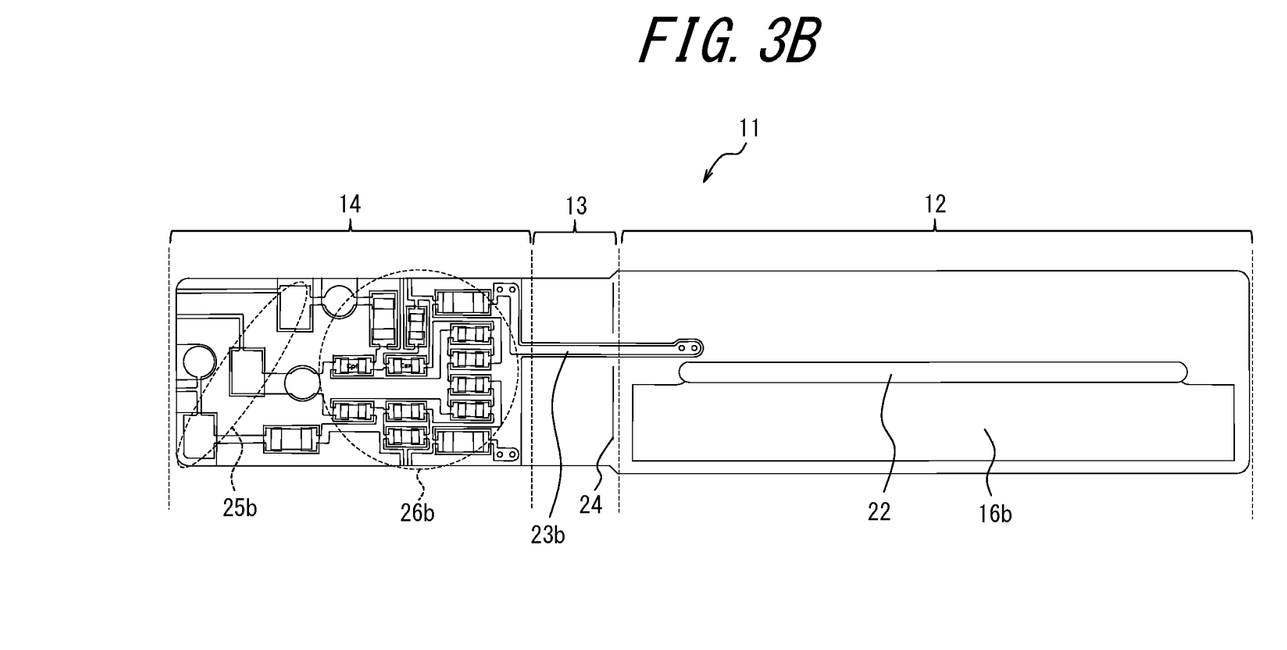
FIG. 3B is a bottom view of the antenna substrate in FIG. 1.
Figure 4:
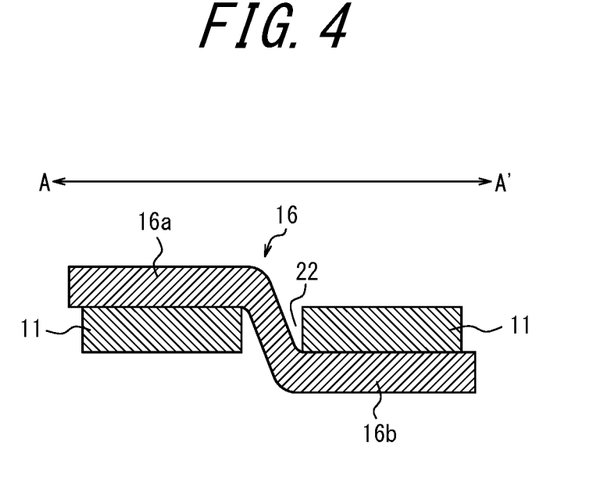
FIG. 4 is a cross-sectional diagram along the A-A' line in FIG. 3A.

In FIG. 1, an example in which the ferrite 16 is provided on the lower surface side of the antenna substrate 11 is illustrated, whereas FIGS. 3A and 3B illustrate an example in which the ferrite 16 is provided on both sides of the antenna coil portion 12. Specifically, as illustrated in FIG. 3A, ferrite 16a that extends from the opening 22 in the negative Y-direction is formed on the upper surface side of the antenna coil portion 12. As illustrated in FIG. 3B, ferrite 16b that extends from the opening 22 in the positive Y-direction is formed on the lower surface side of the antenna coil portion 12. Accordingly, as illustrated in FIG. 4, the ferrite 16 is formed so that a portion thereof (ferrite 16a) extends from the opening 22 on the upper surface side of the antenna substrate 11 while another portion (ferrite 16b) extends from the opening 22 on the lower surface side of the antenna substrate 11.

A circuit pattern 23a that connects the antenna coil portion 12 and the component portion 14 is formed on the upper surface of the bending portion 13. A circuit pattern 23b that connects the antenna coil portion 12 and the component portion 14 is formed on the lower surface of the bending portion 13. Furthermore, a slit 24 extending in the Y-direction is formed in the bending portion 13 near the border between the bending portion 13 and the antenna coil portion 12. The slit 24 is formed so as not to cut off the circuit patterns 23a and 23b. By providing the slit 24, the antenna substrate 11 can easily be bent at the bending portion 13.

In FIGS. 3A and 3B, an example has been illustrated in which the slit 24 is formed near the border between the bending portion 13 and the antenna coil portion 12, but formation of the slit 24 is not limited to this example. The slit 24 may be formed near the border between the bending portion 13 and the component portion 14. Furthermore, the slit 24 may be formed both near the border between the bending portion 13 and the antenna coil portion 12 and near the border between the bending portion 13 and the component portion 14.

On the upper surface of the component portion 14, a connection terminal 25a (I/O interface) is formed for connecting to the body side of the electronic apparatus 1 (the mainboard that executes processing for transmission and reception of signals and executes different types of control) in which at least the antenna device 10 is mounted. Furthermore, on the upper surface of the component portion 14, a circuit pattern 26a for mounting the electronic component 18 is formed. On the lower surface of the component portion 14, a connection terminal 25b (I/O interface) is formed for connecting to the body side of the electronic apparatus 1 (mainboard) in which at least the antenna device 10 is mounted. Furthermore, on the back surface of the component portion 14, a circuit pattern 26b for mounting the electronic component 18 is formed.

A comparison of FIG. 3A and FIG. 3B shows that the circuit structure formed on the upper surface of the component portion 14 (connection terminal 25a and circuit pattern 26a) has approximately the same structure as the circuit structure formed on the lower surface of the component portion 14 (connection terminal 25b and circuit pattern 26b). Therefore, either the upper surface or the lower surface of the component portion 14 can be connected electrically to the mainboard of the electronic apparatus 1, and the same electronic component 18 can be mounted thereon.

Next, a method of mounting the antenna device 10 according to this embodiment is described with reference to FIGS. 1, 2A, and 2B. While not depicted in FIGS. 1, 2A, and 2B, the body 3 of the electronic apparatus 1 illustrated in FIGS. 13A to 13C is disposed on the upper surface side of the antenna device 10 (the adhesive layer 15 side), and the battery 4 of the electronic apparatus 1 illustrated in FIGS. 13A to 13C is disposed on the lower surface side of the antenna device 10 (the adhesive layer 17 side).

As illustrated in FIG. 1, the antenna device 10 can be adhered to the body 3 of the electronic apparatus 1 by the adhesive layer 15 while the antenna substrate 11 is in an unbent state. The antenna device 10 can also be adhered to the battery 4 of the electronic apparatus 1 by the adhesive layer 17 while the antenna substrate 11 is in an unbent state. In this way, the antenna device 10 can be adhered to the electronic apparatus 1 at either the upper surface side or the lower surface side.

When mounting the antenna device 10 while the antenna substrate 11 is in an unbent state, the electronic component 18 is provided on the side opposite from the surface adhered to the electronic apparatus 1. In other words, the electronic component 18 is provided on the lower surface of the component portion 14 when the electronic apparatus 1 (body 3) is adhered to the antenna device 10 by the adhesive layer 15 provided on the upper surface side of the antenna substrate 11. Conversely, the electronic component 18 is provided on the upper surface of the component portion 14 when the electronic apparatus 1 (battery 4) is adhered to the antenna device 10 by the adhesive layer 17 provided on the lower surface side of the antenna substrate 11. Hence, by selecting either the adhesive layer 15 or the adhesive layer 17 as the surface for adhesion to the electronic apparatus 1 in accordance with factors such as the type of electronic apparatus 1 that incorporates the antenna device 10, it is possible to choose whether to provide the electronic component 18 on the upper surface or the lower surface of the component portion 14.

As described above, a connection terminal (connection terminal 25a, 25b) is provided on both the upper surface and the lower surface of the component portion 14. Therefore, when the antenna device 10 is adhered to the electronic apparatus 1 (body 3) via the adhesive layer 15, the connection terminal 25b provided on the lower surface of the component portion 14 can be connected electrically to the mainboard of the electronic apparatus 1. Conversely, when the antenna device 10 is adhered to the electronic apparatus 1 (battery 4) via the adhesive layer 17, the connection terminal 25a provided on the upper surface of the component portion 14 can be connected electrically to the mainboard of the electronic apparatus 1.

The connection terminals 25a and 25b of the antenna substrate 11 and the connection terminal on the mainboard of the electronic apparatus 1 may be connected by a spring pin. In this case, the spring pin may be pressed onto the antenna substrate 11 from above or from below. In the antenna device 10 according to this embodiment, a connection terminal is provided on both the front surface and the back surface of the component portion 14, thereby accommodating both the case of pressing a spring pin onto the antenna substrate 11 from above and the case of pressing a spring pin onto the antenna substrate 11 from below.

As illustrated in FIG. 2A, the antenna device 10 can be adhered to the body 3 of the electronic apparatus 1 by the adhesive layer 15 while the antenna substrate 11 is bent downwards at the bending portion 13. As illustrated in FIG. 2B, the antenna device 10 can also be adhered to the battery 4 of the electronic apparatus 1 by the adhesive layer 17 while the antenna substrate 11 is bent upwards at the bending portion 13.

When mounting the antenna device 10 while the antenna substrate 11 is bent downwards as illustrated in FIG. 2A, the electronic component 18 is provided on the upper surface of the component portion 14 while the antenna substrate 11 is in an unbent state. Accordingly, by bending the antenna substrate 11 downwards, the electronic component 18 is disposed on the opposite side from the surface for adhesion to the electronic apparatus 1. Conversely, when mounting the antenna device 10 while the antenna substrate 11 is bent upwards as illustrated in FIG. 2B, the electronic component 18 is provided on the lower surface of the component portion 14 while the antenna substrate 11 is in an unbent state. Accordingly, by bending the antenna substrate 11 upwards, the electronic component 18 is disposed on the opposite side from the surface for adhesion to the electronic apparatus 1. Hence, by selecting either the adhesive layer 15 or the adhesive layer 17 as the surface for adhesion to the electronic apparatus 1 (i.e. by selecting whether to bend the antenna substrate 11 downwards or upwards) in accordance with factors such as the type of electronic apparatus 1 that incorporates the antenna device 10, it is possible to choose whether to provide the electronic component 18 on the upper surface or the lower surface of the component portion 14.

As described above, a connection terminal (connection terminal 25a, 25b) is similarly provided on both the upper surface and the lower surface of the component portion 14. Therefore, when the antenna device 10 is adhered to the electronic apparatus 1 (body 3) by the adhesive layer 15 while the antenna substrate 11 is bent downwards as illustrated in FIG. 2A, the connection terminal 25a provided on the upper surface while the antenna substrate 11 is in an unbent state can be connected electrically to the mainboard of the electronic apparatus 1. Furthermore, when the antenna device 10 is adhered to the electronic apparatus 1 (battery 4) by the adhesive layer 17 while the antenna substrate 11 is bent upwards as illustrated in FIG. 2B, the connection terminal 25b provided on the lower surface while the antenna substrate 11 is in an unbent state can be connected electrically to the mainboard of the electronic apparatus 1.

As illustrated in FIGS. 2A and 2B, when the antenna device 10 and the electronic apparatus 1 are adhered with the antenna substrate 11 in a bent state, the area in plan view can be reduced by the amount of the antenna substrate 11 that is turned back. In FIG. 2A, the component portion 14 (electronic component 18) is turned back at the lower side of the antenna coil portion 12 to overlap the antenna coil portion 12, but since the ferrite 16 is located between the antenna coil portion 12 and the component portion 14, the effect on communication characteristics can be controlled. In FIG. 2B, the component portion 14 (electronic component 18) is turned back at the upper side of the antenna coil portion 12 to overlap the antenna coil portion 12. Hence, the communication characteristics degrade slightly. By turning back the antenna substrate 11, however, the antenna coil portion 12 can be extended in the X-direction (to increase the size of the antenna coil 21), thereby reducing the effect of degradation in the communication characteristics (and achieving the required communication characteristics).

In this way, the antenna device 10 according to this embodiment is provided with the antenna substrate 11 including the antenna coil portion 12, the component portion 14, and the bending portion 13 arranged along the X-direction, the antenna coil portion 12 having the antenna coil 21 formed therein, and the bending portion 13 being sandwiched between the antenna coil portion 12 and the component portion 14. The connection terminals 25a and 25b are provided respectively on the front surface and the back surface of the component portion 14 for connecting electrically to the body of the electronic apparatus 1. The antenna substrate 11 is bendable at the bending portion 13.

A connection terminal (connection terminals 25a, 25b) for connecting electrically to the body of the electronic apparatus 1 is provided on each of the front surface and the back surface of the component portion 14. Therefore, the antenna device 10 can be adhered to the electronic apparatus 1 and connected electrically to the body (mainboard) of the electronic apparatus 1 regardless of whether the antenna substrate 11 is in an unbent state or is bent upwards or downwards. Hence, the antenna device 10 can be mounted on the electronic apparatus 1 in a variety of forms, thus allowing common use of the antenna device 10 in a plurality of electronic apparatuses 1. As a result, it is unnecessary to design and test an antenna device for each type of electronic apparatus 1, thereby suppressing an increase in costs. Furthermore, by bending the antenna substrate 11, the area in plan view of the antenna substrate when mounted can be reduced by the amount of the antenna substrate 11 that is turned back, thereby reducing the size of the device upon mounting.

Figure 5:
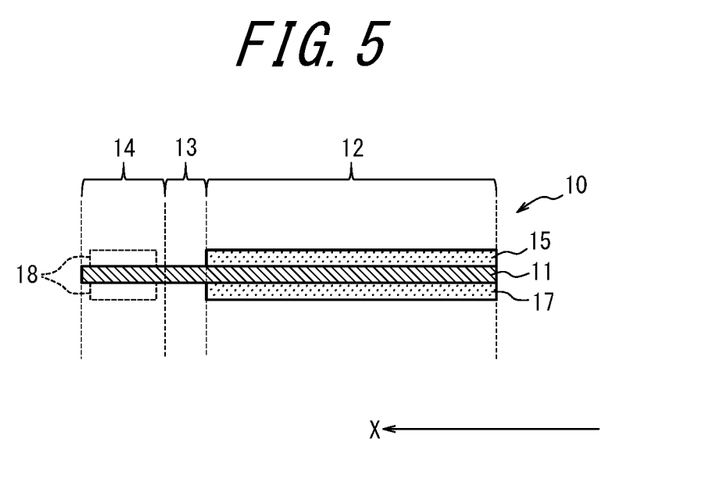
FIG. 5 is a cross-sectional diagram illustrating another structure of an antenna device according to one of the disclosed embodiments.

In this embodiment, an example of the antenna device 10 including the ferrite 16 has been described, but the ferrite 16 is not essential. Accordingly, as illustrated in FIG. 5, the adhesive layer 17 may be provided on the lower surface of the antenna substrate 11, without the antenna device 10 including the ferrite 16. The antenna device 10 without the ferrite 16 in FIG. 5 can reduce costs and is suitable for use for example in IC tags used to manage goods.

Figure 6:
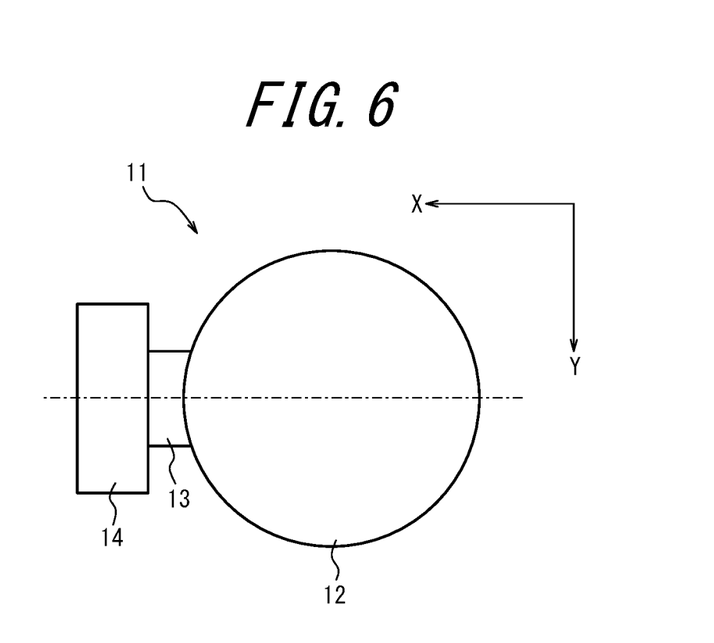
FIG. 6 illustrates another structural example of the antenna substrate in FIG. 1.

In this embodiment, an example of the antenna coil portion 12 of the antenna substrate 11 being rectangular has been described, but this example is not limiting. For example, as illustrated in FIG. 6, the antenna coil portion 12 may be circular. The shape and size of the antenna coil portion 12 are determined by the communication characteristics that are required. The size of the component portion 14 is determined by the size of the circuit mounted thereon. It suffices for the bending portion 13 to have a size that can accommodate two signal wires connecting the antenna coil portion 12 and the component portion 14 or two signal wires and a GND wire. Accordingly, the width of the bending portion 13 in the Y-direction may be smaller than the width of the antenna coil portion 12 and the component portion 14 in the Y-direction.

Figure 7A:
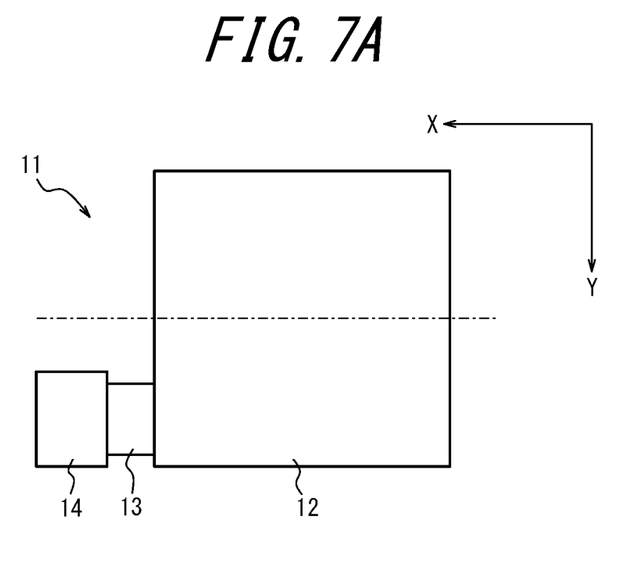
FIGS. 7A and 7B illustrate other structural examples of the antenna substrate in FIG. 1.
Figure 7B:
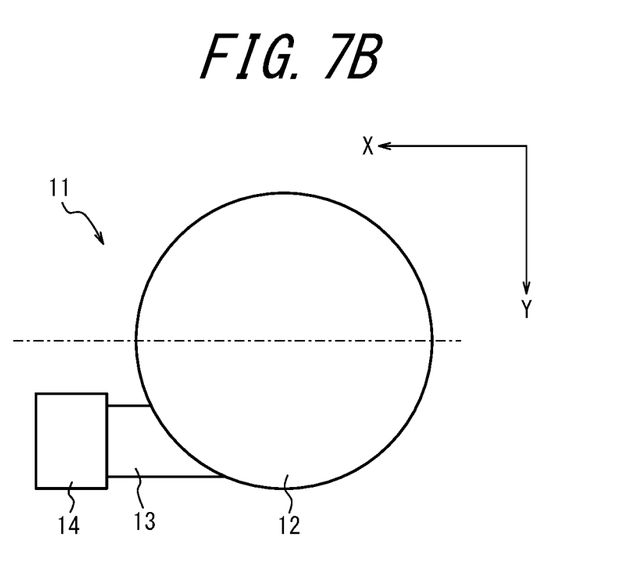

In this embodiment, an example in which the center line of the antenna coil portion 12 in the Y-direction (the dot-dash line in FIGS. 3A and 6, which extends in the X-direction and divides the antenna coil portion 12 into two portions of equal width in the Y-direction) approximately matches the center line of the component portion 14 in the Y-direction has been described, but this example is not limiting. For example, as illustrated in FIGS. 7A and 7B, the center line of the antenna coil portion 12 in the Y-direction (the dot-dash line in FIGS. 7A and 7B) may be shifted from the center line of the component portion 14 in the Y-direction. FIG. 7A illustrates an example of the antenna coil portion 12 being rectangular, and FIG. 7B illustrates an example of the antenna coil portion 12 being circular.

By shifting the center line in the Y-direction of the antenna coil portion 12 from the center line in the Y-direction of the component portion 14, the number of antenna substrates 11 yielded from one standard substrate can be increased. In particular, the center line in the Y-direction of the antenna coil portion 12 and the center line in the Y-direction of the component portion 14 are preferably shifted, and the width of the component portion 14 in the Y-direction is preferably set to ½ or less of the width of the antenna coil portion 12 in the Y-direction.

The antenna device 10 according to this embodiment may be mounted in the electronic apparatus 1 by bending the antenna substrate 11 as illustrated in FIGS. 2A and 2B. In this case, the distance between the ferrite 16 and the electronic component 18 decreases. When a filter, for example, is used as the electronic component 18, the inductor of the filter overlaps with one or more magnetic bodies such as the ferrite 16 or the antenna coil portion 12, producing magnetic interference. The degree of magnetic interference varies in accordance with factors such as the permeability and the thickness of the ferrite 16, the way in which the antenna substrate 11 is bent, and the relative position between the electronic component 18 and the magnetic bodies. Due to this magnetic interference, the inductance and the resistance of the inductor in the filter may rise or fall, the antenna characteristics may change due to this rise or fall, and the antenna current may decrease.

Figure 8:
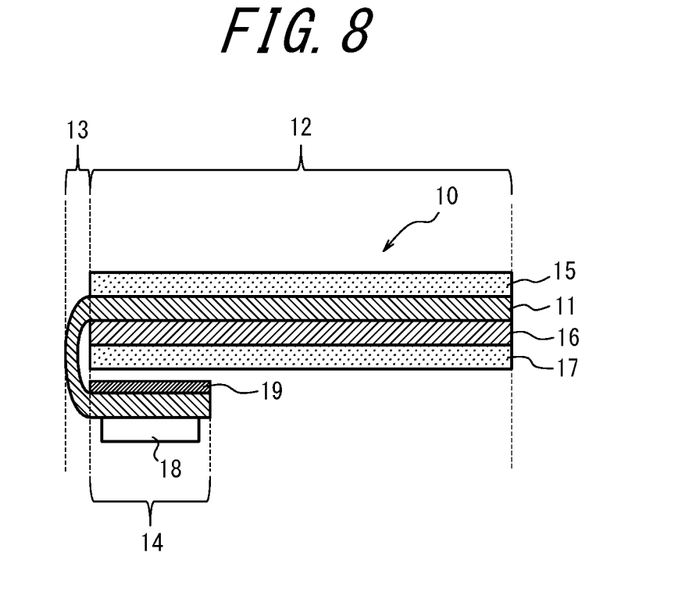
FIG. 8 is a cross-sectional diagram illustrating another structure of an antenna device according to one of the disclosed embodiments.

Therefore, as illustrated in FIG. 8, with the antenna substrate 11 in a bent state, a magnetic shield member 19, such as metal foil, that shields against magnetic fields may be provided between the ferrite 16 and the electronic component 18. Specifically, while the antenna substrate 11 is bent downwards, the magnetic shield member 19 is adhered to the opposite side of the component portion 14 (the lower surface of the component portion 14) from the side on which the electronic component 18 is mounted (the upper surface of the component portion 14). By providing the magnetic shield member 19 between the ferrite 16 and the electronic component 18, the magnetic influence of the ferrite 16 on the electronic component 18 can be reduced. In FIG. 8, the antenna substrate 11 is illustrated as being bent downwards, but when the antenna substrate 11 is bent upwards, the electronic component 18 is mounted on the lower surface of the component portion 14. In this case, the magnetic shield member 19 is adhered to the upper surface side of the component portion 14.

In FIG. 8, an example is illustrated in which the magnetic shield member 19 is adhered to either the upper surface or the lower surface of the component portion 14, but this example is not limiting. It suffices to provide the magnetic shield member 19 between the opposite surface of the component portion 14 from the surface on which the electronic component 18 is mounted and the magnetic body (antenna coil portion 12 or ferrite 16) to allow suppression of magnetic interference between the electronic component 18 mounted on the component portion 14 and the magnetic body such as the ferrite 16, antenna coil portion 12, or the like.

Figure 9:
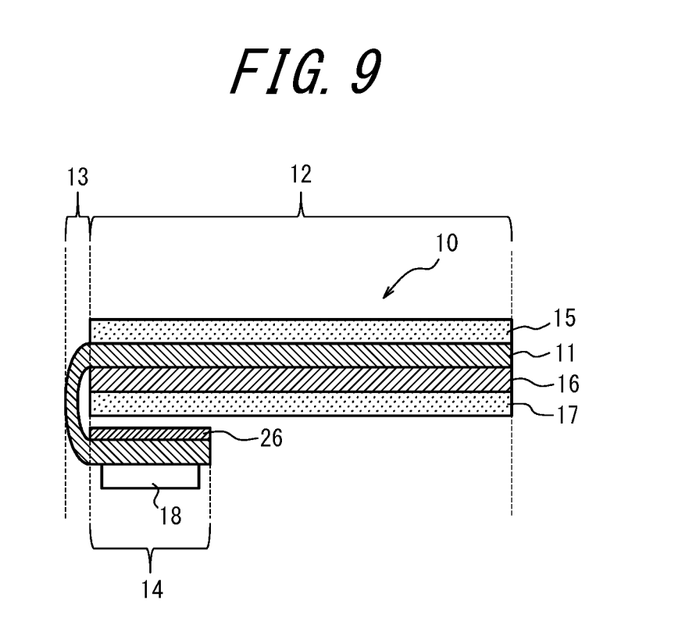
FIG. 9 is a cross-sectional diagram illustrating another structure of an antenna device according to one of the disclosed embodiments.

As illustrated in FIG. 9, instead of providing the magnetic shield member 19 made of metal foil or the like, with the antenna substrate 11 in a bent state, a beta ground pattern 26 connected to ground potential may be formed on the opposite surface of the component portion 14 from the surface on which the electronic component 18 is mounted (the surface on which the I/O interface that connects electrically to the body of the electronic apparatus is provided). By adopting this structure as well, the magnetic influence on the electronic component 18 can be reduced.

As illustrated in FIGS. 8 and 9, when adhering the magnetic shield member 19 to the component portion 14, or when forming the beta ground pattern 26, the surface of the component portion 14 on which the magnetic shield member 19 is adhered or on which the beta ground pattern 26 is formed needs to be determined in accordance with the direction in which the antenna substrate 11 is bent.

Figure 10:
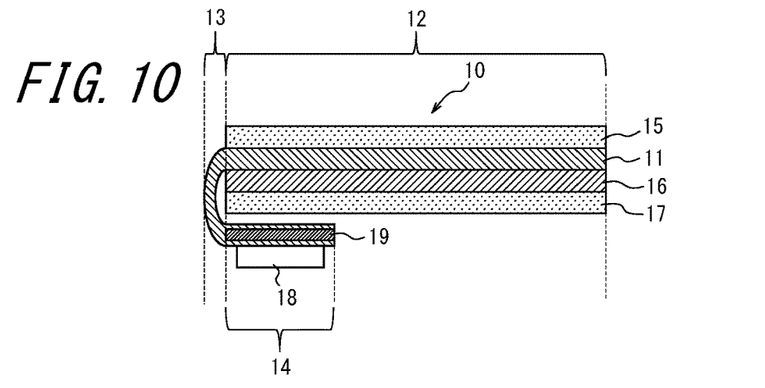
FIG. 10 is a cross-sectional diagram illustrating another structure of an antenna device according to one of the disclosed embodiments.

Therefore, as illustrated in FIG. 10, the magnetic shield member 19 may be formed as an inner layer of the component portion 14. By forming the magnetic shield member 19 as an inner layer of the component portion 14, the surface on which the magnetic shield member 19 is adhered or on which the beta ground pattern 26 is formed does not need to be changed in accordance with the direction in which the antenna substrate 11 is bent, as is the case in FIGS. 8 and 9. This approach is therefore suitable for common use of the antenna device 10.

Figure 11:
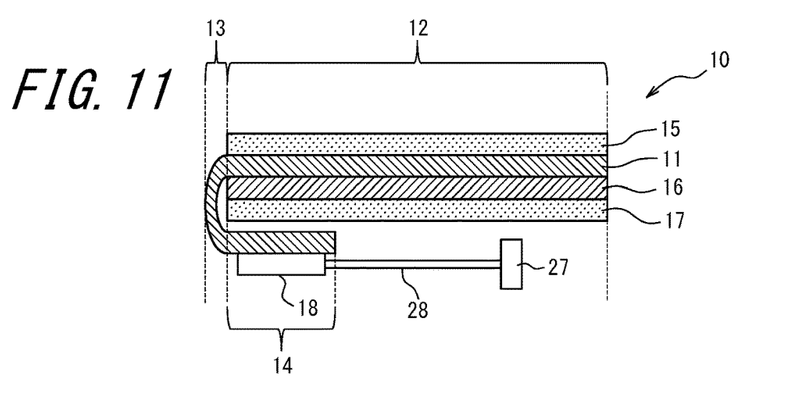
FIG. 11 is a cross-sectional diagram illustrating a mounting example of an antenna device according to one of the disclosed embodiments.

For example when the electronic component 18 mounted on the component portion 14 and a connector 27 are connected by a lead wire 28, as in FIG. 11, the lead wire 28 overlaps with a magnetic body, such as the ferrite 16, producing magnetic interference. The degree of magnetic interference varies in accordance with factors such as the permeability and the thickness of the ferrite 16, the way in which the antenna substrate 11 is bent, and the relative position between the lead wire 28 and the magnetic body. Due to this magnetic interference, the inductance and the resistance of the lead wire 28 may rise or fall, the antenna characteristics may change due to this rise or fall, and the antenna current may decrease.

Figure 12:
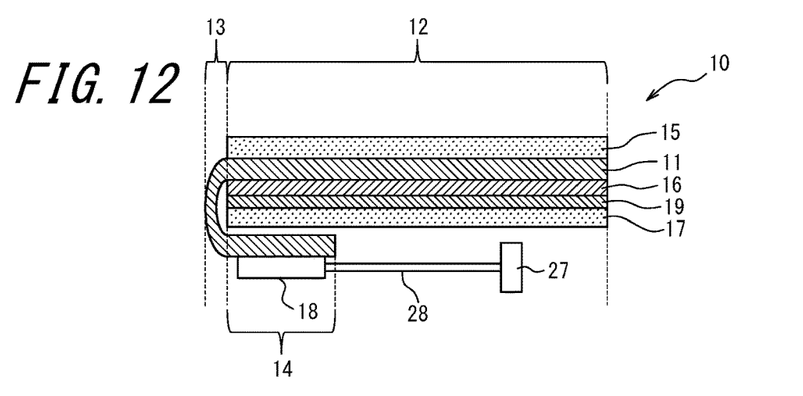
FIG. 12 is a cross-sectional diagram illustrating another structure of an antenna device according to one of the disclosed embodiments.

Therefore, as illustrated in FIG. 12, with the bending portion 13 in a bent state, a magnetic shield member 19, such as metal foil, may be provided on the front surface side or the back surface side of the antenna coil portion 12, whichever faces the opposite side of the component portion 14 from the surface on which the electronic component 18 is mounted (the surface on which the I/O interface that connects electrically to the body of the electronic apparatus is provided). As a result, the magnetic shield member 19 is disposed at least between the antenna coil portion 12 and the lead wire 28, so that the magnetic influence can be reduced.

While this disclosure is based on embodiments and on the accompanying drawings, it is to be noted that various changes and modifications will be apparent to those skilled in the art based on this disclosure. Therefore, such changes and modifications are to be understood as included within the scope of this disclosure.

The invention claimed is:

1. An antenna device to be incorporated in an electronic apparatus, the antenna device comprising:
    an antenna substrate including an antenna coil portion having an antenna coil formed therein, a component portion, and a bending portion arranged along a first direction, the bending portion being sandwiched between the antenna coil portion and the component portion, wherein
    on each of a front surface and a back surface of the component portion, a circuit structure including an I/O interface for connecting electrically to a mainboard of the electronic apparatus is located;
    the antenna substrate is bendable at the bending portion, and
    the circuit structure located on the front surface of the component portion has the same structure as the circuit structure located on the back surface of the component portion.

2. The antenna device of claim 1, further comprising a magnetic sheet on at least one of a front surface and a back surface of the antenna coil portion.

3. The antenna device of claim 1, wherein an electronic component is mounted on one of the front surface and the back surface of the component portion.

4. The antenna device of claim 1, wherein the bending portion includes a slit extending in a second direction orthogonal to the first direction.

5. The antenna device of claim 1, wherein a width of the component portion in a second direction orthogonal to the first direction is less than a width of the antenna coil portion in the second direction.

6. The antenna device of claim 1, wherein a center line of the antenna coil portion in a second direction orthogonal to the first direction is shifted from a center line of the component portion in the second direction.

7. The antenna device of claim 1, wherein
a magnetic shield member that shields against magnetic fields is provided on the front surface side or the back surface side of the component portion.

8. The antenna device of claim 1, wherein
a beta ground pattern that shields against magnetic fields is formed on the front surface or the back surface of the component portion.

9. The antenna device of claim 1, wherein
a magnetic shield member that shields against magnetic fields is provided on a front surface side or a back surface side of the antenna coil portion.

10. The antenna device of claim 1, further comprising a magnetic shield member that shields against magnetic fields on an inner layer of the component portion.

11. An electronic apparatus into which the antenna device of claim 1 is incorporated,
wherein the electronic apparatus is adhered to one of a front surface and a back surface of the antenna coil portion by an adhesive member.

12. The electronic apparatus of claim 11, wherein the bending portion is bent.

13. A method of mounting an antenna device in an electronic apparatus into which the antenna device of claim 1 is incorporated, the method comprising:
adhering the electronic apparatus to one of a front surface and a back surface of the antenna coil portion with an adhesive member.

14. The method of claim 13, wherein the bending portion is bent.

* * * * *